J. CAREY.
PRINTED MATTER.
APPLICATION FILED FEB. 16, 1916.

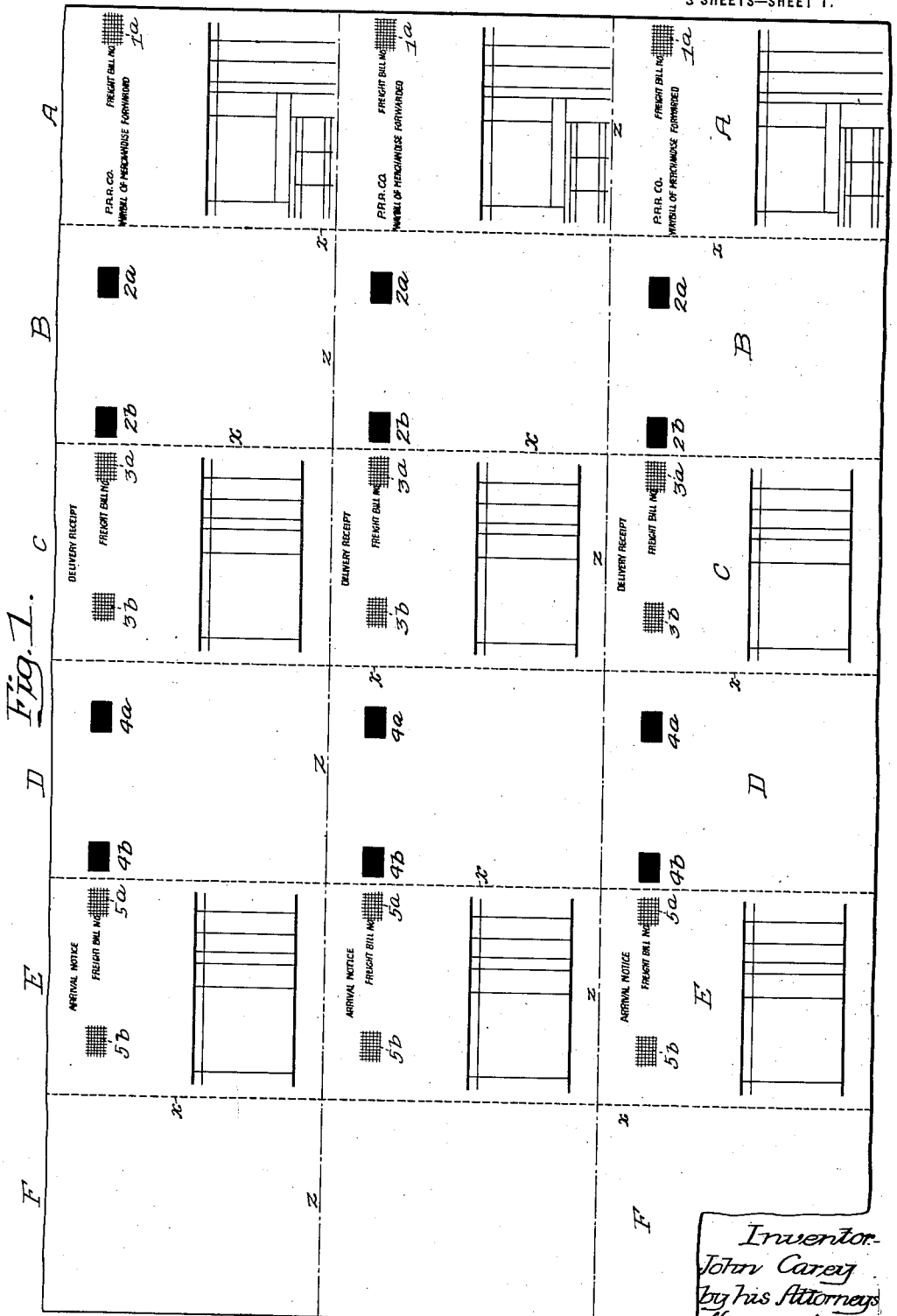

1,198,326.

Patented Sept. 12, 1916.
3 SHEETS—SHEET 2.

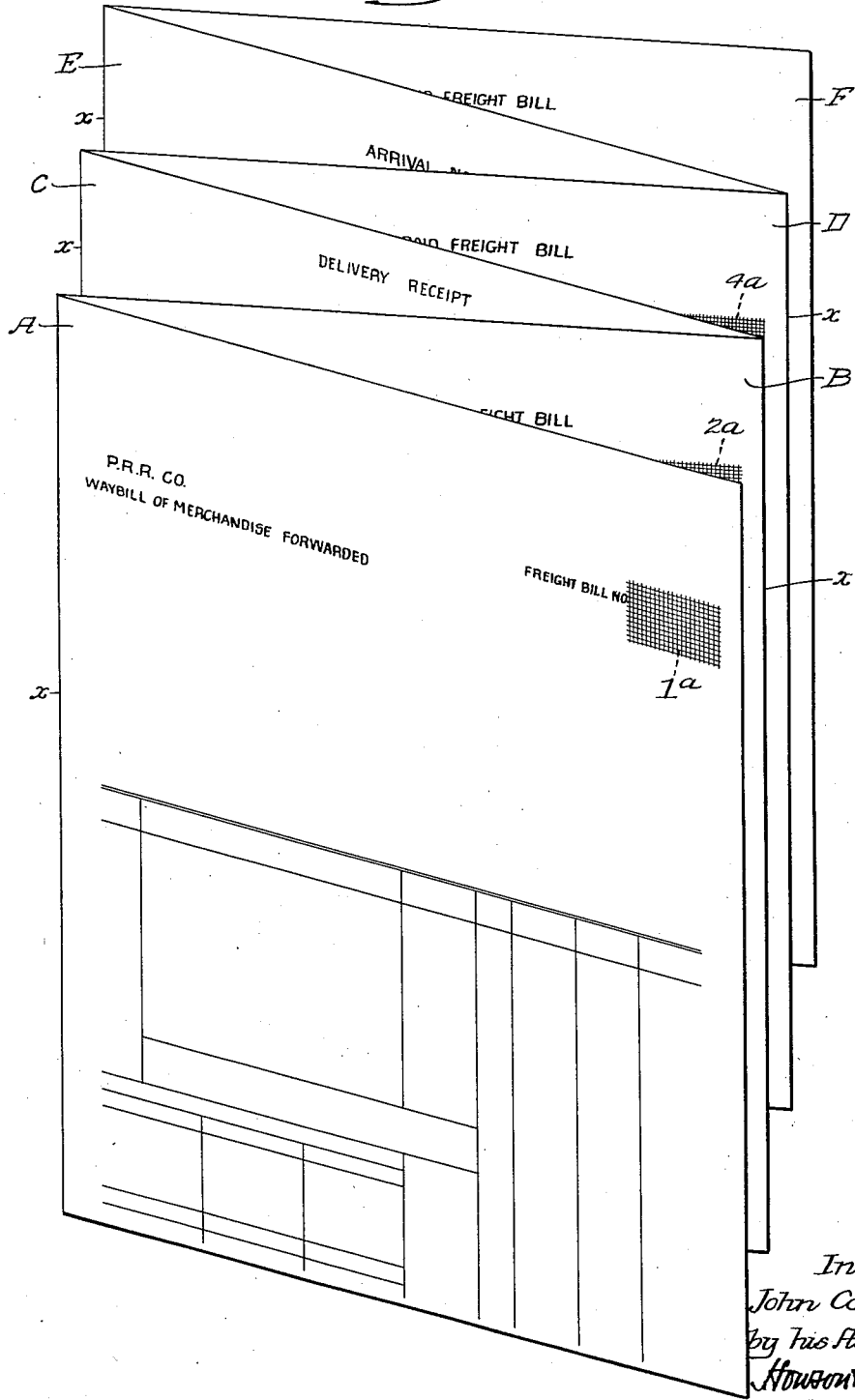

ized.

UNITED STATES PATENT OFFICE.

JOHN CAREY, OF PHILADELPHIA, PENNSYLVANIA, ASSIGNOR TO STEPHEN GREENE COMPANY, OF PHILADELPHIA, PENNSYLVANIA, A CORPORATION OF PENNSYLVANIA.

PRINTED MATTER.

1,198,326.     Specification of Letters Patent.     Patented Sept. 12, 1916.

Application filed February 16, 1916. Serial No. 78,752.

*To all whom it may concern:*

Be it known that I, JOHN CAREY, a citizen of the United States, and a resident of Philadelphia, Pennsylvania, have invented certain Improvements in Printed Matter, of which the following is a specification.

My invention relates to printed matter in the form of railroad and other expense bills which usually comprise a form sheet folded into a plurality of leaves or sections, each of which leaves, while constituting part of the whole sheet, may be complete in itself and is designed to be separated from the rest for filing purposes. In the use of such form sheet, it is often desirable to duplicate matter on certan sections or leaves of the form sheet which cannot be supplied when the original filling out is done, and to this end I provide such sheet with patches of transfer-material at the back and front of certain or all of the leaves of the same or, in some instances, only upon one side of the leaves; such transfer-material being provided in different colors, if desired, so that if necessary or desirable superposed sections or leaves of the sheet with transfer-material thereon may receive impressions of contrasting color upon the back of the transfer-material-carrying portion.

While my invention has been applied in use more particularly with reference to a railroad expense bill, which may comprise a combination way-bill, freight-bill, agent's mem., arrival notice, delivery receipt, etc., for use by railroad companies and similar common carriers, it will be understood that the invention may be employed for various analogous purposes, being available wherever duplication of special data is desirable before the several sections or leaves constituting the original sheet are separated therefrom.

These and other features of my invention are more fully described hereinafter, reference being had to the accompanying drawings, in which:

Figure 1, is a plan view of one side of a sheet having a set of six leaves or sections constituting a railroad expense bill which may be a combination way-bill, freight-bill, &c., upon which transfer material is applied in accordance with my invention; Fig. 2, is a view similar to Fig. 1, showing the opposite side of the sheet; Fig. 3, is a perspective view of a single folded instrument before separation, and Fig. 4, is a sectional view on the line IV—IV, Fig. 2.

In preparing the improved railroad expense bill or any other instrument which is to be divided into a number of parts, each receiving data transferred by the use of ordinary transfer sheets, I provide such parts with isolated areas or patches of transfer material of a nature substantially similar to that employed upon the transfer sheets, and this transfer material is positioned for the duplication on certain of the sheets and at certain points of matter that is not known and cannot be applied at the time the bill or other instrument has its major portion filled out. The additional matter may be the number of the bill, the date of arrival of shipment at destination, the number of the car on which the shipment is loaded, and any other matter in the nature of the business or related to the function served by the instrument, which is not and cannot be known when such instrument is first filled out.

In the use of an instrument of this character, the combination form is filled out in the office of the forwarding station or agent with the requisite data respecting the character of the shipment, the route, weight, charges, and other known matters of a similar nature which are filled in on the top sheet by a typewriter and duplicated upon the several sections of the combination instrument by means of interposed sheets of transfer paper.

By having patches of transfer material at necessary points on the sections of the combination sheet, means are afforded whereby data not available when the original bill was transcribed upon the typewriter, can be applied later to the first sheet and transferred or duplicated upon as many of the succeeding sheets as may be necessary or desirable; such marking taking place at the station receiving the shipment and before the various sections of the bills are separated. When separated into its constituent parts, the original instrument may comprise a "way-bill of merchandise forwarded;" an "office copy of way-bill of merchandise forwarded;" an "agent's mem.;" a "freight-bill;" a combined "arrival notice and delivery receipt," and the "freight-bill" which goes to the shipper (or consignee) and carries the complete memorandum of charges.

The complete sheet or instrument I have illustrated is a well known structure commonly used at the present time for the preparation of freight-bills, way-bills and the like, and while it may be made of any number of sections within certain limits, in the present instance it is made up of six sections, A, B, C, D, E and F, which are fanfolded on the lines $x$ so as to provide a suitable width for passage through a typewriting machine; the fanfolding of the sheet providing for the reception of five layers or sheets of transfer paper (not shown) so that original entries made by the typewriter or other means upon the first page or section A will be transferred to and duplicated upon the other pages B, C, D, E and F. In the use of such a form the greater portion of the data are filled in in the forwarding office, and the instrument, if not ready for immediate use, is sent to the office of destination where the final data are supplied, or is forwarded with the shipment to its destination where the additional data can be filled in on the several sheets at one operation as before described.

To facilitate the placement and duplication of the additional data, the several sheets, A, B, C, D and E, making up the complete structure carry upon the back of the same isolated patches of carbon transfer material $1^a$; $2^a$ and $2^b$; $3^a$ and $3^b$; $4^a$ and $4^b$, and $5^a$ and $5^b$, whereby entries made by pencil, typewriter or other means on the first sheet A of the instrument, or upon sheets B, C, D or E, over or upon such patches of transfer material will be duplicated upon as many of the sheets as may be desired. In some instances it may not be necessary to duplicate all of the data upon all of the sheets, and in such case the sheet preceding that one upon which the data is to be omitted will not be supplied with the backing of transfer material. In the present instance, sheet A contains transfer material for a duplication of only a portion of the added data; sheets B, C, D and E, contain transfer material for transferring all of the added data, while sheet F is blank.

The transfer patches $1^a$, $2^a$, $2^b$, &c., are placed upon the backs of the sheets at the time the faces of the same are printed, and while, in most instances, the transfer patches will be black, other colors may be employed for certain of the sheets, if desired.

After the operation of printing and simultaneous application of the patches of transfer material upon the several sections of the sheet, the latter is preferably carried in a long tortuous path through the machine in order that such transfer material may set; being fanfolded after such setting and emerging from the machine with the respective sections superposed one upon another.

The size of the bills is indicated by the broken lines $z$, and after being filled out they may be separated by any suitable means.

I claim:

1. A sheet for expense bills comprising a plurality of leaves or sections initially connected together and fanfolded to lie in superposed form; certain of said sections or leaves having isolated areas of transfer-material on one face of the same and certain of the respective areas of said transfer-material registering with each other so that data placed upon one leaf over such transfer-material will be transferred to certain of the other leaves.

2. A sheet for expense bills comprising a plurality of leaves or sections initially connected together and fanfolded to lie in superposed form whereby independent carbon sheets may be inserted between the leaves thereof; said sections or leaves carrying isolated areas of transfer-material on one face of the same; said areas of said transfer-material registering with each other so that data placed upon one leaf over such transfer-material will be transferred to the respective leaves.

3. As a new article of manufacture, a folded sheet of leaves each having printed matter upon one face or side of the same and provided with isolated areas of transfer-material; said areas of transfer material being in a definite position relative to a portion of the printed matter upon the several leaves so that data placed upon one leaf over the area of transfer-material will be duplicated upon other leaves.

4. As a new article of manufacture, a plurality of leaves or sections connected together at their edges to form a continuous sheet which is fan-folded; said leaves having printed matter on one face of the same and being separable from the whole; certain of said leaves having patches of transfer-material upon the other face of the same which register with each other whereby matter inserted upon one of said leaves over said transfer-material may be transferred to other leaves.

5. As a new article of manufacture, a plurality of leaves or sections connected together at their edges to form a continuous sheet which is fan-folded to place the leaves in superposed position; said leaves having printed matter on one face of the same; certain of said leaves having registering patches of transfer-material upon the nonprinted faces of the same whereby matter inserted upon one of said leaves over said transfer material may be transferred to other leaves; and certain of the leaves being blank at their point of registry with the patches of transfer-material so that added matter duplicated by said patches of transfer-material may be omitted from an underlying leaf.

JOHN CAREY.